(12) United States Patent
Baratono et al.

(10) Patent No.: US 6,625,426 B2
(45) Date of Patent: Sep. 23, 2003

(54) COMBINED REAR VIEW MIRROR AND TELEPHONE

(76) Inventors: Ronald Baratono, 15754 Champaign, Allen Park, MI (US) 48101; Mossad Abbas, 8 Wares Road, Ridgewood, Uckfield, East Sussex TN22 5TW (GB)

( * ) Notice: Subject to any disclaimer, the term of this patent is extended or adjusted under 35 U.S.C. 154(b) by 105 days.

(21) Appl. No.: 09/735,455

(22) Filed: Dec. 12, 2000

(65) Prior Publication Data

US 2002/0004416 A1 Jan. 10, 2002

Related U.S. Application Data

(63) Continuation-in-part of application No. 09/532,859, filed on Mar. 22, 2000.
(60) Provisional application No. 60/125,647, filed on Mar. 22, 1999.

(51) Int. Cl.[7] .................................................. H04B 1/16
(52) U.S. Cl. ......................................... 455/90; 455/345
(58) Field of Search .......................... 455/66, 550, 575, 455/90, 344, 345, 351; 379/433.1, 446, 447, 454, 455

(56) References Cited

U.S. PATENT DOCUMENTS 5,649,317 A * 7/1997 Suzuki ......................... 455/90
5,940,503 A * 8/1999 Palett et al. ................ 379/454

* cited by examiner

Primary Examiner—Thanh Chong Le
(74) Attorney, Agent, or Firm—Arnold S. Weintraub, Esq.

(57) ABSTRACT

A mobile telephone or cellular phone unit and a rear view mirror housing of an automobile are combined to provide an improved phone apparatus that enables a hands-free use by a driver while operating the vehicle, the improved phone apparatus includes a rear view mirror housing, the housing including a rearview mirror, and phone for sending and receiving phone calls, and is removably connected thereto. A telephone key pad is cooperatively connected to the phone for dialing the phone. An attachment bracket attaches the mirror housing to the vehicle. The phone is removably attached to the rear view mirror housing. The housing has the electronic circuitry incorporated therewith to which a phone is connectable.

14 Claims, 4 Drawing Sheets

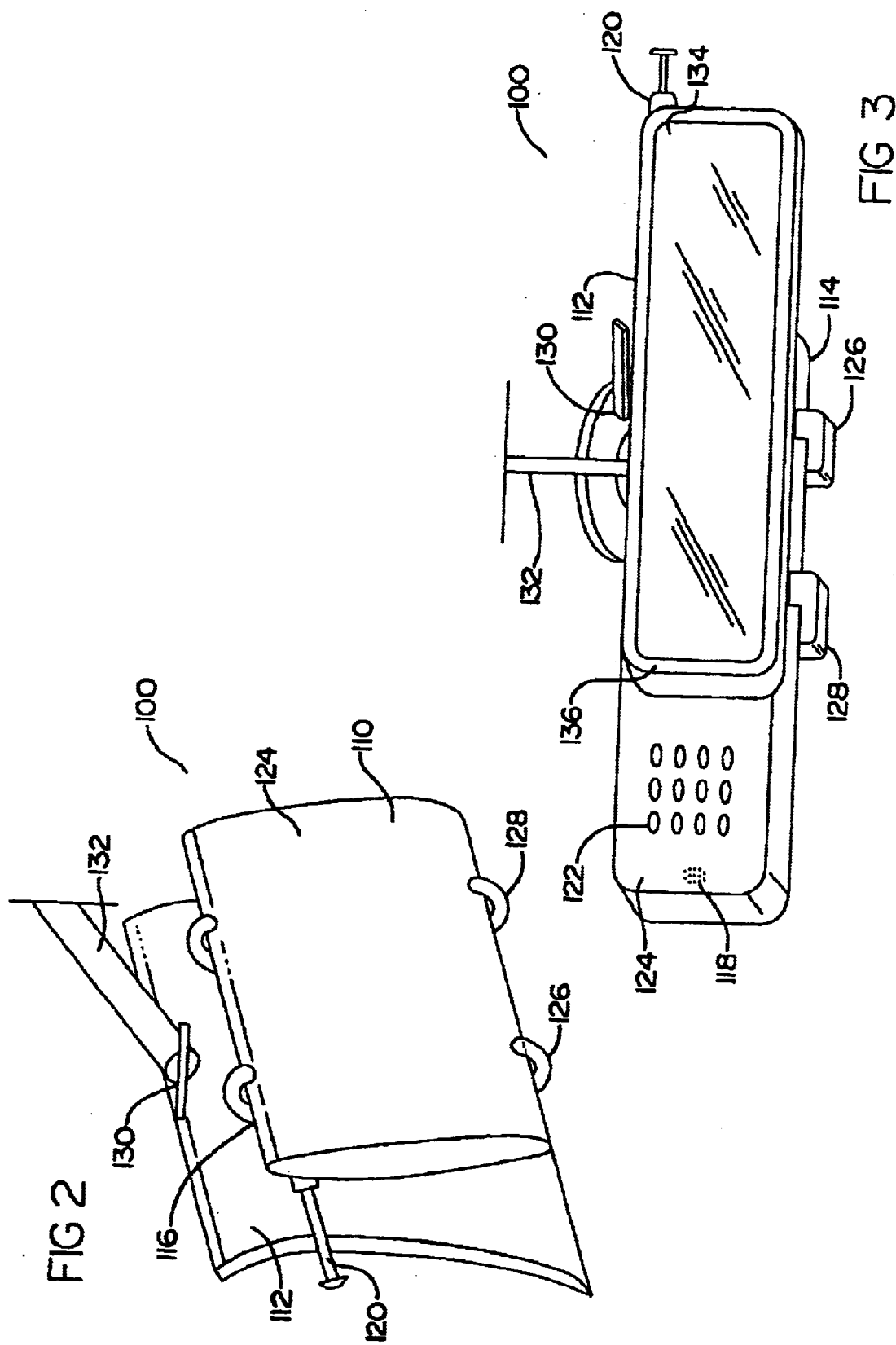

COMBINED REAR VIEW MIRROR AND TELEPHONE

CROSS-REFERENCE TO RELATED APPLICATIONS

This application is a continuation-in-part application of co-pending U.S. patent application, Ser. No. 09/532,859, filed Mar. 22, 2000, which, in turn, is a completion application of U.S. Provisional Application No. 60/125,647, filed Mar. 22, 1999, and entitled COMBINED REAR VIEW MIRROR AND TELEPHONE, the disclosures of which are incorporated by reference.

BACKGROUND OF THE INVENTION

1. Field of the Invention

The present invention relates to mobile telephones or cellular phones used in automobiles. More particularly, the present invention relates to a hands-free mobile telephone or cellular phone unit for use in an automobile.

2. Description of Related Art

The use of cellular phones within an automobile is well known as providing a convenient means of communication. To better serve drivers, cellular phones have been mounted in a number of places within an automobile. For instance, cellular phones have been placed in the central console between the driver and the passenger seats or alternatively have been placed in the dashboard. U.S. Pat. No. 5,418,316 discloses a combined radio and telephone unit that is mounted in the center console of an automobile. U.S. Pat. No. 5,202,913 teaches placement of the mobile phone unit within a recess of a dashboard.

As the roads and highways become increasingly crowded, it becomes imperative that a driver's concentration be distracted as little as possible. It has been discovered that the use of cellular phones by the driver of a vehicle constitutes a significant road hazard, especially during the period when the driver is either dialing or answering the phone.

To address the problem, a number of attempts have been made to locate the cellular phone within a vehicle or provide convenient hands-free use. For example, U.S. Pat. No. 4,850,015 teaches a cellular phone for use in a vehicle where the telephone is mounted on the steering wheel. With the advent of air bags and crowding of numerous other controls upon the steering wheel, such as radios or cruise control, the usefulness of a steering wheel mounted cellular phone has become minimized.

Attempts have also been made to improve the placement of the phone, while concealing the phone when not in use. U.S. Pat. Nos. 4,875,229 and 4,056,696 teach a cellular phone mounted on a sun visor where the phone can be hidden from view by tilting the visor up when not in use.

Vehicular cellular phones have also been designed to allow for hands-free operation or use of the telephone without a handset. For instance, U.S. Pat. No. 4,905,270 teaches a cellular telephone where the microphone is mounted on a vehicle sun visor. Sounds are picked up by the microphone and then FM transmitted to a receiver in the vehicle before the communication signal is sent outside the vehicle.

While present day attempts have been made to improve the convenience of a cellular phone's location within a vehicle, as noted above, such attempts have failed to improve the overall safety associated with dialing and answering the phone.

Particularly, present day car phones have failed to provide a means for the driver to answer or dial a cellular phone while concurrently viewing both oncoming traffic in the driver's forward field of view and upcoming traffic in the rearward field of view.

SUMMARY OF THE INVENTION

The present invention addresses the above stated problems, and others, by providing an improved vehicular cellular phone as detailed hereinafter. The subject cellular phone is a rearview mirror combined with a cellular telephone, generally comprising a rearview mirror housing, said housing including a rearview mirror, cellular phone means, and dialing means for dialing and answering the phone, and attachment means for attaching the mirror housing to the vehicle, whereby a driver may dial and answer the cellular telephone while monitoring road conditions in both a forward field of view and a rearward field of view.

The combined rear view mirror and telephone apparatus includes arrangements wherein the cellular phone means is non-removably integrated into said rear view mirror housing is a separate phone that is removably mounted to the rear view housing.

Additionally, the improved rear view mirror and telephone apparatus further comprises the attachment means including a bracket for routing electrical wires between a power source and the phone; fastening means for fastening the bracket to the windshield of the vehicle; and adjustment means for adjusting and fixing the position of the mirror housing relative to the vehicle and to the user of the phone.

For a more complete understanding of the present invention, reference is made to the following detailed description and accompanying drawings. In the drawings, like reference characters refer to like parts throughout the several views in which:

BRIEF DESCRIPTION OF THE DRAWINGS

FIG. 2 is a side perspective view of a second embodiment of a mobile telephone unit in accordance with the present invention;

FIG. 3 is a front view of the mobile telephone unit shown in FIG. 2;

DESCRIPTION OF THE PREFERRED EMBODIMENTS OF THE INVENTION

Figure 1:
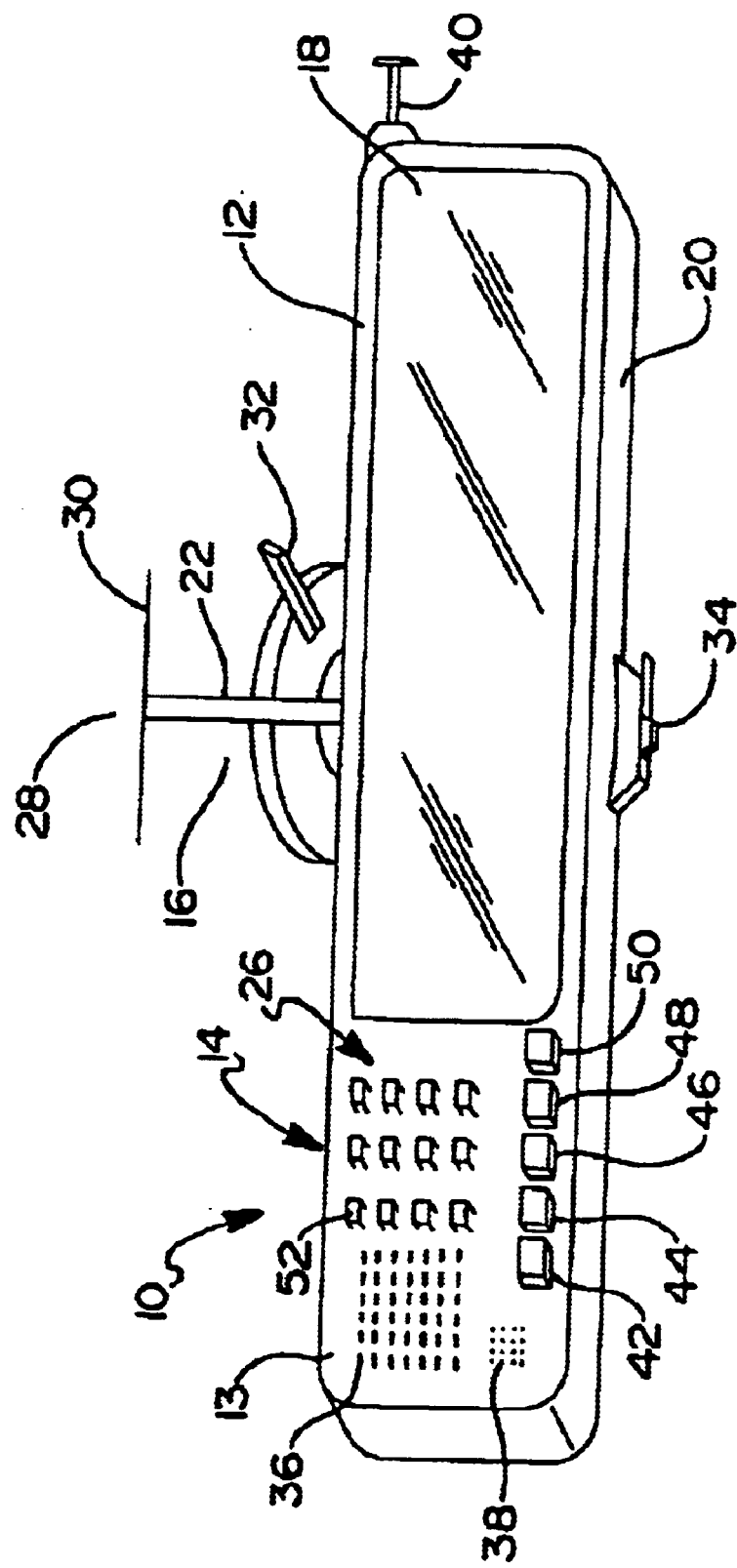
FIG. 1 is a front perspective view of a first embodiment of a mobile telephone unit in accordance with the present invention.

With more particularity, FIGS. 1–3 discloses improved cellular phones in accordance with the present invention.

It is contemplated that all necessary cellular phone components, such as a speaker, a microphone, an antenna, as well as all conventional electrical components, handset, sending unit, power source, and alphanumeric display may be housed within a rear view mirror housing to form a complete cellular phone.

Referring now to FIG. 1 there is shown an improved cellular phone 10. The cellular phone 10 is a complete cellular phone system in and of itself and comprises a generally rectangular rear view mirror housing 20 having a support member 26 facing the driver, the support member defining a rear view mirror portion 12 and a phone operating portion 13; a dialing means 14 associated with the phone operating portion 13 for dialing the cellular phone; and an attachment means 16 for attaching the housing to a vehicle. The housing 20 supports the conventional electrical circuit boards and wiring of the phone, all of which are conventional and not shown.

A mirror or reflecting surface 18 is supported on the rear view mirror portion 12 of the housing 20 using conventional means, such as a frame, support grooves or channels or an adhesive. The mirror 18 is preferably glass with a reflecting coating deposited thereunder. The mirror may be any type commonly used in vehicular rear view mirrors.

The attachment means 16 for attaching the rear view mirror phone 10 to a vehicle may be any suitable vehicle bracket or fixture adapted to connect and adjustably support the rear view mirror housing 20 at an appropriate location within the vehicle. As shown, the attachment means 16 comprises an elongated bracket 22 connected to the back of the housing 20 by suitable means, such as a ball and socket (not shown). The bracket 22 may be a hollow cylindrical tube to allow for wiring and power cables to pass therethrough or a solid member.

The dialing means 14 is in the form of a number pad comprising an array of buttons or keys 52 and an array of function keys 42, 44, 46, 48, the keys being supported on a mount or circuit board (not shown) within the housing and projecting upwardly through openings formed in the operating portion 13 of the support member 26.

Certain of the buttons or keys 52 represent the numbers from "0" to "9", the asterisk "*", and the pound key "#". The function keys 42, 44, 46, 48 and 50 correspond to functions typically found on cellular phones and initiate the following functions: an answer and receive button 42; a message sending button 44, a store and dial button 46, a speed dial button 48, and a redial button 50, all of which are generally known in the art of cellular phones.

The dialing means 14 may be electronically connected to a display panel (not shown) to show dialed numbers before a correction signal is sent from the cellular phone 10. The display panel may be a liquid crystal display with a backlight or may be any other display typically used in electronic devices.

Alternatively, the display may be an image projecting device (not shown) supported in the housing 20 or in any other suitable location, the projecting device being adapted to project dialed numbers onto a windshield as the digits are dialed. Once the corresponding number is dialed the message-sending button 44 transmits the corresponding phone number to establish a phone connection.

The answer and receive button 42 is positioned in conjunction with the housing 20 to allow the driver to answer incoming calls while limiting the time the driver's attention is distracted from the road. Alternatively, the answer button 42 can also be the message-sending button 44, as is known in some cellular telephones.

A fastening means 28 for fastening the bracket 22 to the vehicle is provided. Preferably, the fastening means 28 provides for attachment to the front windshield of the vehicle using fastening expedients, such as adhesives or screws.

As shown, the fastening means 28 comprises a mounting pad or plate 30 which is fastened to the bracket by appropriate means such as by welding or by being made integrally therewith. Of course, the bracket 22 may be positioned on the vehicle in any manner suitable for use as a rear view mirror in any number of ways. For instance, the attachment may be made to the roof of the vehicle by using screws instead of by attachment with adhesive to the windshield, as long as the driver can simultaneously view oncoming traffic as well as the road behind.

A position fixing means 32 for fixing the position (such as the angle) of the mirror 18 is connected to the attachment means 16 to allow the driver to quickly adjust the angle of the mirror 18 and then lock the rear view mirror housing 20 in place. The position fixing means 32 is necessary, where, in operation. the pressing of the buttons and function keys 42, . . . , 50 supported within the rear view mirror housing 20 could result in an undesired change in the mirror position or field of view.

The position fixing means 32 is releasably connected between the rear view mirror housing and the bracket 22 and may comprise any suitable locking mechanism, such as a clamp, friction lock, adjustable friction fitting or other securing fixture. Thus, unlike a conventional rear view mirror, when the position fixing means 32 is activated, such as by the turning of a compression fitting to lock the ball and socket joint together, any force applied to the rear view mirror housing does not result in a change in position of the mirror or the mirror's field of view.

An adjustment means 34 for adjusting the position of the rear view mirror housing 20 about the bracket 22 to alleviate headlight glare at night is coupled to the bracket 22. The adjustment means 34, as shown, comprises a flip lever or toggle switch as is commonly used in most vehicular rear view mirrors.

It is contemplated that all necessary cellular phone components may be housed within the rear view mirror portion to form a complete cellular phone.

It is also contemplated that the conventional components of a cellular phone may be placed elsewhere in a vehicle as long as the necessary electrical components are in electrical communication with the dialing means 14 supported by the rear view mirror housing 20.

For example, the car battery (not shown) may be the power source in electrical communication with the conventional cellular phone electronics. The car battery is separate from the rear view mirror housing 20 but is in electrical communication therewith by using appropriate wiring. Further, a battery (not shown) supported by the rear view mirror housing 20 and in electrical communication with the electronics of the cellular phone by way of conductive connectors and suitable wiring may constitute the power source.

Alternatively, a solar panel (not shown) and battery (not shown) may power the rear view mirror phone. The solar panel is used to recharge the battery or alternatively power the cellular phone. The solar panel is in electrical communication with the battery and other conventional electrical components of the cellular phone. The solar panel is supported in any appropriate location on the vehicle, but is preferably supported on the backside of the housing member, opposite the mirror reflecting side. The preferred position is such that when the solar panel is placed in an automobile, exposure of the solar collector to light entering the automobile is maximized.

In an alternative embodiment, the speaker 36 and the microphone 38 may be separated from the rear view mirror housing 20, or may be separable therefrom.

For example, the speaker 36, as shown, may be replaced with a speaker connection to the radio speakers of the vehicle. Further, the speaker 36 and the microphone 38 may be replaced with a jack and a headset (not shown). The speaker and microphone of the cellular phone may be formed as a detachable unit from the rear view mirror housing 20, such as by means of a handset (not shown). The handset may be located on the dashboard or console between the front seats, while the dialing means 14 remains housed within the rear view mirror housing 20.

In yet another alternative embodiment, the answer and receive function performed by the button 42 can be initiated when the handset is picked up or by using conventional electronic switching means. The handset can be used to provide privacy during conversations and to reduce sound distortion. Furthermore, the phone function may be voice activated in the manner well-known to the skilled artisan.

FIG. 2 illustrates another embodiment of an improved rear view mirror phone in accordance with this invention. The improved rear view mirror phone, shown generally at 100, comprises a cellular telephone 110 in combination with a vehicular rear view mirror assembly 112. The rear view mirror assembly 112 is essentially conventional in that it generally comprises a mirror housing 136 and a mirror 134 supported in the housing. The cellular phone 110 is releasably attached to the rear view mirror assembly 112 and is operable therefrom.

FIG. 3 illustrates a front view of the rear view mirror phone 100. The operating components of the cellular phone 110 are essentially conventional, comprising such generally known elements as speakers 114 and 116, a microphone 118, an antenna 120, a number pad with associated buttons or function keys 122, and associated electrical circuitry (not shown), all disposed in a phone housing 124.

Unlike a conventional cellular phone, the cellular phone 110 of the present invention differs in the layout of the buttons and function keys 122 and may also differ in the positioning of the speaker(s). The keys 122 are supported by their connection to a circuit board (not shown) seated within the cellular phone housing 124 and compressively retained. The number keys 122 are preferably disposed in a horizontal fashion relative to the positioning of the cellular phone 110 as attached to the rear view mirror 112. Positioning the keys 122 in a horizontal fashion allows the driver to easily read the characters displayed thereon upon use. Further, the number keys 122 may be recessed within the housing 124 so that when the cellular phone 110 is removed from the rear view mirror assembly 112 and used as a handset, the keys 122 are not accidentally pressed.

The rear view mirror assembly 112 further comprises attaching means 126 for releasably attaching the cellular phone 110 to the rear view mirror assembly 112, releasable locking means 130 for releasably locking the position of the mirror 134 relative to the attaching means 126, and connecting means 132 for connecting the rear view mirror assembly 112 to the vehicle.

The attaching means 126, as shown, comprises at least one clip or mounting bracket 126 attached to the rear view mirror assembly 112 using suitable fastening means such as adhesives or screws. Preferably a pair or laterally spaced clips 126 are used. The clips 126 operate to expand and accept the housing 124 of the cellular phone 110 and tightly but releasably hold it to the rear view mirror assembly 112.

The releasable locking means 130 operates to secure the otherwise adjustable mirror assembly 112 so that upon dialing the cellular phone 110 when it is seated within the clips 126, the angle of the mirror 134 is not altered.

The connecting means 132 are conventional, and as described above, can comprise an adhesive or screws.

Figure 4:
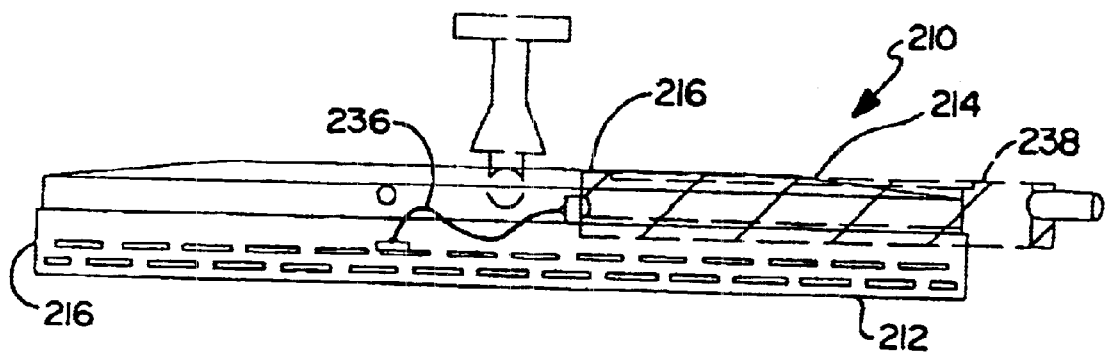
FIG. 4 is a side elevational view, partly in phantom, showing a further embodiment hereof.
Figure 6:
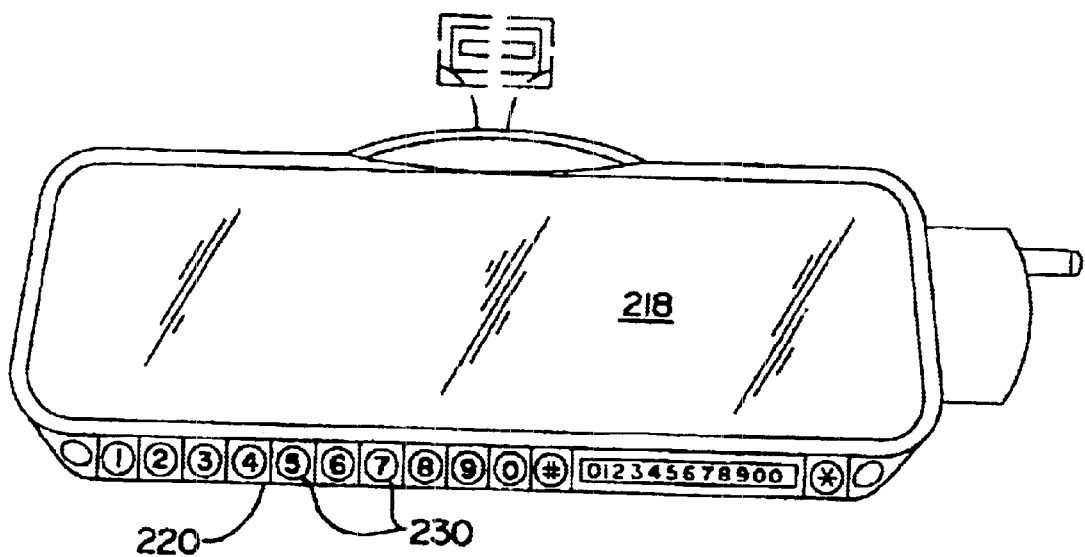
FIG. 6 is a perspective view of the embodiment of FIG. 4.
Figure 5:
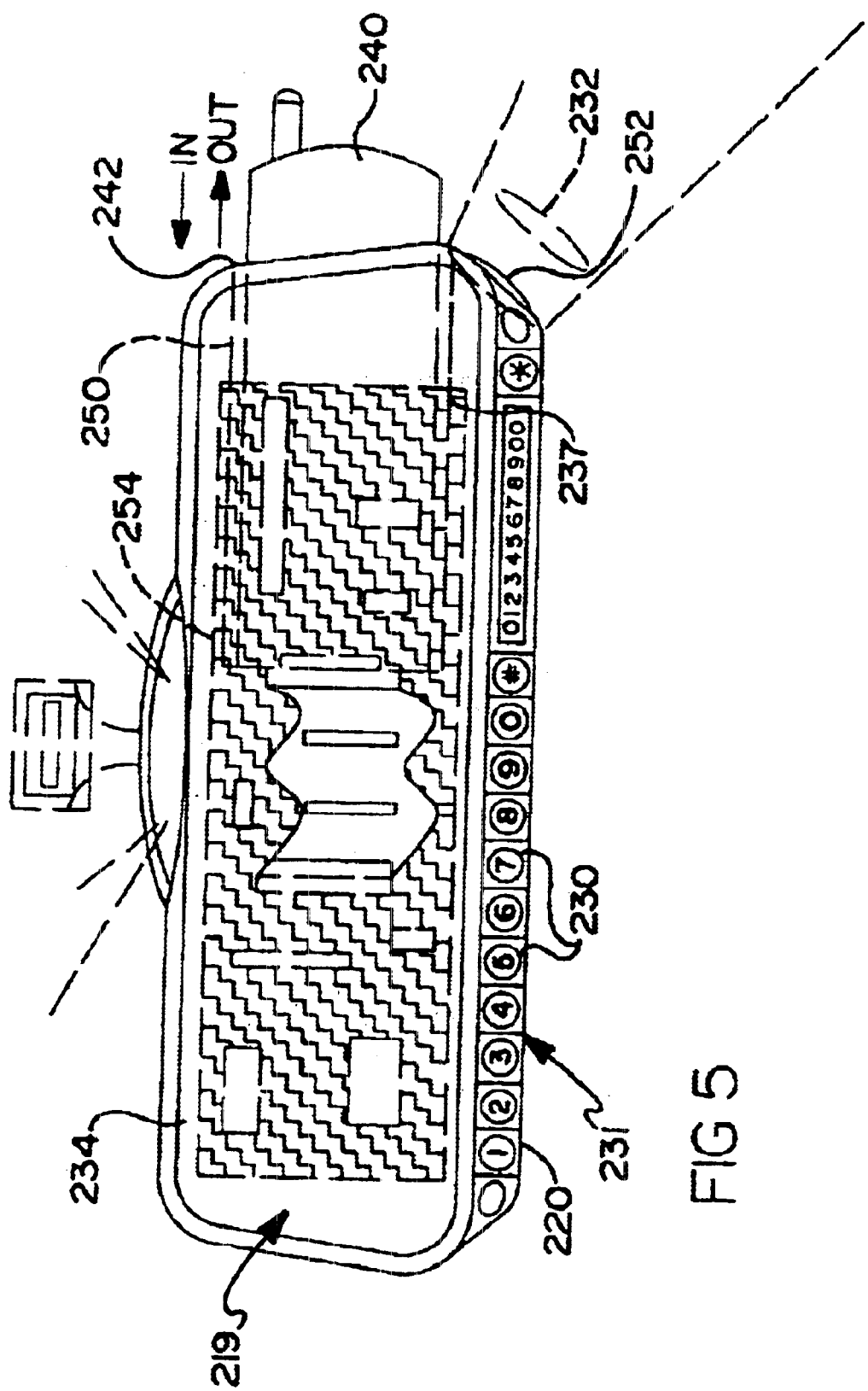
FIG. 5 is a perspective view, partly in phantom, of the embodiment of FIG. 4.

Furthermore, although not shown, suitable bracketry may be suspended from the mirror housing to enable the phone to be "snap fitted" into and out of the bracketry to enable easy detachment and mounting thereof, thus, enabling the use of a conventional Now, and with reference to FIGS. 4 through 6, there is depicted therein a further embodiment of the present invention and which is, generally, denoted at 210 According to this embodiment, there is provided a housing or frame 212 which comprises a front wall 214, and a peripheral side wall 218. The walls 212, 214 and 216 cooperate to form a substantially rectangular enclosure having a hallow interior 219.

A reflective surface or mirror 218 is affixed to or otherwise provided on the front wall 214 which functions as a rear view mirror.

Disposed about the periphery of the side wall 216 are a plurality of openings 220 in which are disposed a plurality of push buttons 230. The push buttons 230 correspond to the numbers, symbols and alphabetical array associated with a telephone. Thus, there is provided on the side wall, in essence, a linear array of push buttons which correspond to the numbers of a telephone key pad, including both the star or asterisk as well as the pound sign, and include the digits one through zero, thus defining a linear key pad 231.

A speaker grid 232 is also provided on the housing on the side wall thereof which covers a speaker 233 disposed within the housing interior 219.

As shown in FIGS. 4 and 5, also disposed within the interior 219 of the housing is suitable electronic circuitry illustrated as at 234. The electric circuitry is telephone circuitry, i.e., a circuit board 237 or the like, and which provides electrical communication between the key pad 231 and the board 237. An extension cord and plug assembly 236 extend from the board 237.

As shown in FIG. 4, the side wall 216 is provided with an opening 238, through which is insertable a portable or cellular phone 240, as described below. The opening 238 provides access to a pocket 242 formed within the interior of the housing 212.

As shown in FIGS. 4 and 5, disposed within the exterior 219 of the housing are a pair of spaced apart slide tracks 250, 252 and a rear wall 254. The tracks 250, 252 and the wall 254 are integrally formed and cooperate with the front wall 214 to form the pocket 242. As noted, the pocket 242 is adapted to slidingly receive a phone 240 thereof.

The rear wall 254 defines a stop for limiting the degree of insertion of the phone.

The cellular phone 240 is of conventional configuration having a plug 260 formed therewithin and which has a complementary pronged configuration to that of the plug assembly 236 associated with the circuit board 237 to enable the phone to be rendered in electrical circuitry with the electronics provided by the circuit board, thus thereby enabling the electronics associated with the housing 212 to override any of the circuitry associated with the phone itself. Thus the phone is operable via the key pad disposed on the side wall.

It is to be noted in this regard that the actual configuration of the circuitry is not critical hereto and such is well known to the skilled artisan. What is critical hereto is that the phone be rendered operable through the circuitry associated with the mirror housing and be actuable via the key paid associated with the housing.

A mounting assembly 260 similar to that of FIG. 1 shown at 16 is provided herein to enable the mounting of the instant mirror to a windshield or other suitable spot on a vehicle. Similarly, a power source, such as a battery and, preferably the vehicle battery, is used to power the phone where it is being operated from the housing. In other words, the electronic means 237 is powered by a suitable source, preferably, the vehicle batter through suitable and well-known wiring connection.

It is be appreciated that according to this embodiment, the phone is removable from the pocket where necessary, but at all other times when placed in electronic communication with the circuit board it has its operation controlled at the mirror itself without the need for access to the phone, per se.

Preferably, a hand held cellular phone is used in the practice hereof.

In this regard, it is further contemplated that the mirror be in electrical communication with another display screen for displaying e-mail, stock quotes and similar information accessed by and received by the phone through a wireless web or the like.

While the invention has been illustrated in detail in the drawings and in the foregoing description, the same is to be considered as illustrative and not restrictive in nature. It is understood that only the preferred embodiments have been shown and described fully and that all changes and modifications that come within the spirit of the invention are desired to be protected.

It is to be appreciated from the preceding that there has been described herein an improved vehicular phone, the vehicular phone comprising a rear view mirror and cellular phone means including means for receiving. dialing and sending messages and enabling a hands free use of the phone by the driver while concurrently viewing oncoming traffic in the driver's forward field of view and upcoming traffic in the rearward field of view.

Having thus described the invention, what is claimed is:

1. A combined rear view mirror and telephone apparatus for a vehicle to enable a hands-free operation of a portable cell phone by a driver of the vehicle, comprising a rear view mirror housing, said housing having a front wall, a rear wall, and a peripheral side wall, the housing walls forming an interior chamber, said housing further including:

a socket extending into the housing interior, said socket opening on said side wall and sized to receive an end portion of the phone inserted therewithin, a rear view mirror on said front wall, electronic means for operating said phone when disposed within the housing, said electronic means including:

(1) means for overriding the electrical circuitry of said phone and rendering the phone in electrical communication therewith; and (2) a key pad, the key pad being actuatable to operate a phone disposed within the socket; and attachment means for attaching the mirror housing to the vehicle.

2. The combined rear view mirror and telephone assembly of claim 1 wherein:

the side wall has a plurality of openings provided in a linear array, and further wherein, the key pad comprises a plurality of individual push buttons each associated with the electronic means, each side button being associated with and projecting through an associated opening in the side wall.

3. The combined rear view mirror and telephone apparatus of claim 2 which further comprises:

a circuit board disposed in the housing and defining, at least in part, the electronic means; and a plug assembly extending from the circuit board, said plug assembly being connectable to said portable cell phone to render the phone operable by the electronic means.

4. The combined rear view mirror and telephone apparatus as claimed in claim 1 and further comprising electrical power means in electrical communication with said cellular phone for providing electrical power to operate said cellular phone, said electrical power means comprising the battery of the vehicle, and an electrical wire, said wire connecting the vehicle battery to the electronic means.

5. A combined rear view mirror and telephone apparatus for a vehicle to enable a hands-free operation of a portable cellular phone by the driver of the vehicle, comprising:

a generally rectangular housing for mounting a rear view mirror, said housing having a peripheral sidewall, and an interior chamber, said housing including first means for removably receiving said cellular phone, said first means including a socket which opens on said sidewall and is sized to receive and connect to an end portion of said cellular phone inserted therewithin, second means for operating said cellular phone when disposed in said socket, and third means for operably connecting said second means in electrical circuit relation with said phone when disposed in said socket.

6. The combined rear view mirror and telephone assembly of claim 5 wherein said socket includes a pair of spaced-apart slide tracks, and an interior end wall spaced from the socket opening, said slide tracks being adapted to slidingly receive and guide said cellular phone to said end wall, and said end wall defining a stop for limiting inward insertion of the cellular phone.

7. The combined rear view mirror and telephone assembly of claim 6 and further comprising electrical power means in electrical communication with said cellular phone for providing electrical power to operate said cellular phone.

8. The combined rear view mirror and telephone assembly of claim 7 wherein said electrical power means comprises a battery, said battery being separate and apart from the battery of the vehicle and attached to said housing.

9. The combined rear view mirror and telephone assembly of claim 6 wherein said second means comprises a key pad, the key pad being adapted to actuate said phone when disposed within said socket.

10. The combined rear view mirror and telephone assembly of claim 9 wherein said second means comprises a key pad, the key pad being adapted to actuate said phone when disposed within said socket.

11. The combined rear view mirror and telephone assembly of claim 10 wherein said second means comprises:

an electronic circuit board disposed in said interior chamber, an electrical connector disposed in said socket, said connector being connectible to said cellular phone when the end portion of the phone is within said socket, and a conductive element extending between said circuit board and said electrical connector, said conductive element placing said connector and said circuit board in electrical relation with the phone whereby to override the circuitry within the phone and render the phone operable by said key pads when the phone is inserted within said socket.

12. The combined rear view mirror and telephone assembly of claim 9 wherein:

said vehicle includes a windshield, and said housing includes a front wall for receiving said rear view mirror, a rear wall facing said windshield, and an array of openings, and said key pad comprises a plurality of individual push buttons to actuate said cellular phone, each push button being movably disposed within a corresponding opening and operably associated with said second means.

13. The combined rear view mirror and telephone assembly of claim 12 wherein said electrical power means comprises the battery of the vehicle, and the conductive element is an electrical wire connecting the vehicle battery to the second means.

14. A combined rear view mirror and telephone assembly for a vehicle that enables hands-free use by a driver while operating the vehicle, the combination comprising:

a portable phone for sending and receiving calls, said phone having an end portion, first electrical circuitry for operating the phone, an electrical connector in electrical circuit relation with said electrical circuitry, and a key pad in electrical circuit relation with said electrical circuitry for dialing the phone when sending calls, and a rear view mirror housing, the housing including an exterior surface for mounting a rearview mirror, an interior chamber, a receptacle, said receptacle opening on said surface and extending into said chamber, said opening and said receptacle being sized to receive the end portion of said phone and removably mount the phone to said housing, and second electronic circuitry in said chamber, said second electrical circuitry being electrically connectible to the electrical connector of said phone when the phone is disposed in said receptacle, a second key pad in electrical circuit relation with said second electrical circuitry, said second key pad and said second electrical circuitry for overriding the first electrical circuitry associated with the phone and dialing the phone for sending calls when said phone is disposed within said receptacle.

* * * * *